United States Patent
Lee

(10) Patent No.: US 11,268,557 B2
(45) Date of Patent: Mar. 8, 2022

(54) RIVET FASTENER ASSEMBLY AND METHOD OF USE THEREOF

(71) Applicant: ILLINOIS TOOL WORKS INC., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 107 days.

(21) Appl. No.: 16/575,685

(22) Filed: Sep. 19, 2019

(65) Prior Publication Data
US 2020/0116184 A1    Apr. 16, 2020

Related U.S. Application Data

(60) Provisional application No. 62/744,000, filed on Oct. 10, 2018.

(51) Int. Cl.
*F16B 37/16* (2006.01)
*F16B 13/08* (2006.01)

(52) U.S. Cl.
CPC .............................. *F16B 13/0808* (2013.01)

(58) Field of Classification Search
CPC ............... F16B 13/0808; F16B 13/0833; F16B 13/0841; F16B 13/0866; F16B 13/122
USPC ...... 411/32, 33, 34, 38, 80.1, 80.2, 80.6, 17, 411/26, 55, 57.1, 60.2, 63, 80.5
See application file for complete search history.

(56) References Cited

U.S. PATENT DOCUMENTS

| | | | |
|---|---|---|---|
| 519,172 A * | 5/1894 | Calkins | |
| 1,161,155 A * | 11/1915 | Pleister | F16B 19/1054 411/34 |
| 2,324,142 A | 7/1943 | Eklund | |
| 2,964,989 A * | 12/1960 | George | F16B 13/061 411/38 |
| 3,136,203 A * | 6/1964 | Davis | F16B 19/1072 411/38 |
| 3,236,143 A | 2/1966 | Wing | |
| 3,279,304 A | 10/1966 | Hopkins | |
| 3,512,448 A * | 5/1970 | Philip | F16B 13/063 411/53 |
| 3,789,727 A | 2/1974 | Moran | |
| 3,858,479 A | 1/1975 | Sekhon | |
| 3,888,156 A * | 6/1975 | Fima | F16B 13/061 411/38 |
| 3,984,132 A * | 10/1976 | Sarson | F16L 41/082 285/222 |

(Continued)

FOREIGN PATENT DOCUMENTS

| | | |
|---|---|---|
| CN | 1521412 A | 8/2004 |
| CN | 201428676 Y | 3/2010 |

(Continued)

OTHER PUBLICATIONS

International Search Report for PCT/US2017/041636, dated Oct. 5, 2017. (11 pages).

(Continued)

*Primary Examiner* — Gary W Estremsky
(74) *Attorney, Agent, or Firm* — Quarles & Brady LLP

(57) ABSTRACT

A fastener assembly including a fastener body having a collar and a receiving column with a protrusion on an inner surface thereof, and a pin having a threaded section. The protrusion is configured to engage and cooperate with the threaded section.

17 Claims, 9 Drawing Sheets

(56) References Cited

U.S. PATENT DOCUMENTS

| | | | |
|---|---|---|---|
| 4,211,145 A | 7/1980 | Dolch | |
| 4,285,265 A | 8/1981 | Rieper | |
| 4,475,856 A * | 10/1984 | Toomingas | F16B 13/065 411/33 |
| 4,541,761 A | 9/1985 | Bryce, Jr. | |
| 4,556,351 A | 12/1985 | Wollar et al. | |
| 4,585,382 A | 4/1986 | Bryce, Jr. | |
| 4,610,587 A * | 9/1986 | Wollar | F16B 13/124 411/182 |
| 4,639,175 A | 1/1987 | Wollar | |
| 4,642,009 A * | 2/1987 | Fischer | F16B 13/061 411/38 |
| 4,708,553 A | 11/1987 | Braychak et al. | |
| 4,863,325 A | 9/1989 | Smith | |
| 4,875,815 A | 10/1989 | Phillips, II | |
| 4,890,966 A * | 1/1990 | Umezawa | F16B 13/0808 24/289 |
| 5,018,919 A * | 5/1991 | Stephan | E21D 21/0026 411/33 |
| 5,205,688 A | 4/1993 | Sundstrom | |
| 5,244,324 A | 9/1993 | Smith | |
| 5,690,454 A * | 11/1997 | Smith | F16B 13/002 411/30 |
| 5,725,341 A * | 3/1998 | Hofmeister | F16B 13/061 411/258 |
| 6,551,040 B1 | 4/2003 | Terry et al. | |
| 6,609,866 B2 * | 8/2003 | Huang | F16B 13/001 411/30 |
| 6,719,509 B1 * | 4/2004 | Huang | F16B 13/025 411/32 |
| 6,746,191 B2 * | 6/2004 | Edland | F16B 13/061 411/34 |
| 6,761,520 B1 | 7/2004 | Dise | |
| 6,835,038 B2 * | 12/2004 | Benito-Navazo | F16B 13/061 411/372.5 |
| 6,969,220 B2 * | 11/2005 | Anquetin | F16B 13/002 411/38 |
| 7,621,950 B1 * | 11/2009 | Globerman | C25F 3/22 623/17.11 |
| 7,887,273 B2 | 2/2011 | Vigliotti et al. | |
| 8,602,703 B1 * | 12/2013 | Rich | F16B 13/061 411/38 |
| 8,728,160 B2 * | 5/2014 | Globerman | A61F 2/02 623/17.11 |
| 8,931,988 B2 * | 1/2015 | Shimizu | F16B 13/124 411/55 |
| 9,062,703 B2 * | 6/2015 | Schneider | F16B 5/04 |
| 9,309,906 B2 * | 4/2016 | Hsu | F16B 13/003 |
| 9,453,524 B2 * | 9/2016 | Sisto | F16B 13/0808 |
| 10,215,210 B2 * | 2/2019 | Busby | F16B 39/22 |
| 2002/0154963 A1 | 10/2002 | Jennings et al. | |
| 2005/0013678 A1 | 1/2005 | Smith | |
| 2006/0182512 A1 | 8/2006 | Williams | |
| 2007/0059120 A1 | 3/2007 | Vigliotti et al. | |
| 2013/0243542 A1 | 9/2013 | Saltenberger et al. | |
| 2014/0377030 A1 | 12/2014 | Dunford et al. | |
| 2018/0238371 A1 | 8/2018 | Cochard et al. | |
| 2019/0219086 A1 * | 7/2019 | Lee | F16B 19/1054 |
| 2019/0264722 A1 | 8/2019 | Lee et al. | |
| 2020/0116184 A1 | 4/2020 | Lee | |

FOREIGN PATENT DOCUMENTS

| | | |
|---|---|---|
| CN | 202165364 U | 3/2012 |
| DE | 102010002847 A1 | 9/2011 |
| DE | 102011106436 A1 | 1/2013 |
| DE | 202013005407 U1 | 6/2013 |
| DE | 102014104539 A1 | 10/2015 |
| EP | 0691479 A1 | 1/1996 |
| EP | 1728569 A1 | 12/2006 |
| GB | 2185081 A | 7/1987 |
| GB | 2412417 A | 9/2005 |
| WO | 2011094056 A1 | 8/2011 |
| WO | 2018/031168 A1 | 2/2018 |

OTHER PUBLICATIONS

First Office Action from corresponding Chinese Patent Application No. 201780048642.0, dated May 22, 2020 (16 pages) (English translation included).

Examination Report for German Patent Application No. 10 2019 101 078.0, dated Dec. 1, 2020 (22 pages) English translation included).

* cited by examiner

RIVET FASTENER ASSEMBLY AND METHOD OF USE THEREOF

CROSS REFERENCE TO RELATED APPLICATIONS

This application is based on, claims priority to, and incorporates herein by reference in its entirety U.S. Provisional Application Ser. No. 62/744,000, filed on Oct. 10, 2018, and entitled "Rivet Fastener Assembly and Method of Use Thereof."

REFERENCE REGARDING FEDERALLY SPONSORED RESEARCH OR DEVELOPMENT

Not applicable

SEQUENCE LISTING

Not applicable

BACKGROUND OF THE INVENTION

1. Field of the Invention

The present disclosure generally relates to fastener assemblies and, more particularly, fastener assemblies having a rivet body and a pin that cooperates with the rivet body through axial rotation.

2. Description of the Background of the Invention

Fastener assemblies may be used in a variety of applications, including automobile manufacturing. For example, a panel, such as an interior frame panel or an exterior door panel, may be secured to another panel or component using a fastener assembly. Particular examples may include an interior frame panel that may be secured to an exterior door panel. Typical prior art fastener assemblies comprise rivets or rivet assemblies that are configured to fit within a hole to secure a plurality of components together. Such conventional prior art fastener assemblies may lose retention strength over time when a load or force is applied to the fastener assemblies or when a load or force is applied to areas adjacent or remote from the fastener assemblies. Therefore, a need exists for a fastener or fastener assembly that has improved retention strength and variable functionality.

SUMMARY OF THE INVENTION

In one aspect, a fastener assembly includes a fastener body having an annular collar and a receiving column. The receiving column comprises a first set of legs, a second set of legs, and at least one radial protrusion on an inner surface of the receiving column.

In related embodiments, the fastener assembly includes a fastener body and a pin. In these embodiments, the fastener body includes a collar and a receiving column having a protrusion on an inner surface thereof, and the pin includes a threaded section.

In some aspects, the pin is configured to be positioned within the receiving column and further includes reinforcing legs configured to fold upon rotation of the pin. Further, the reinforcing legs may include a first set of legs and a second set of legs. The receiving column may also include a lower distal end, and the protrusion may cooperate with the threaded section to move the lower distal end relative to the pin upon rotation of the pin. The reinforcing legs may also be configured to collapse upon rotation of the pin.

In further aspects, the collar may include a radial protrusion. In these embodiments, the pin may remain engaged with the radial protrusion throughout rotation of the pin. Further, the receiving column may include four radial protrusions equally spaced around a circumference of the inner surface of the receiving column. An annular rim may also extend between the first set of legs and the second set of legs, and the annular rim may include a plurality of recessed surfaces.

In another aspect, the fastener assembly includes a fastener body with a collar and a receiving column, and a pin. Further, the receiving column is configured to collapse upon rotation of the pin.

In some embodiments, the receiving column may include a distal end wall and the collar may include a bottom surface. The receiving column may extend between the bottom surface and the distal end wall. In further aspects, the pin may include a head, and a distance between the head of the pin and the distal end wall of the receiving column in the collapsed state may be smaller than a distance between the head of the pin and the distal end wall of the receiving column in an initial state. Further, a distance between the head of the pin and the bottom surface of the collar in the collapsed state may be equal to a distance between the head of the pin and the bottom surface of the collar in an initial state. The receiving column may further include reinforcing legs configured to fold upon rotation of the pin, and the reinforcing legs may include a first set of legs and a second set of legs. An annular rim may also extend between the first set of legs and the second set of legs, and a lower annular rim may extend between the second set of legs and the distal end wall. Further, the annular rim may comprise a recessed surface.

In a further aspect, the fastener assembly includes a fastener body having a collar and a receiving column, and a pin having a head. The receiving column is configured to collapse upon rotation of the pin, and a distance between the head of the pin and a bottom surface of the collar in the collapsed state is equal to a distance between the head of the pin and the bottom surface of the collar in an initial state.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims herein for interpreting the scope of the disclosure.

BRIEF DESCRIPTION OF THE DRAWINGS

The present disclosure will be better understood and features, aspects, and advantages other than those set forth above will become apparent when consideration is given to the following detailed description thereof. Such detailed description makes reference to the following drawings.

Figure 1:
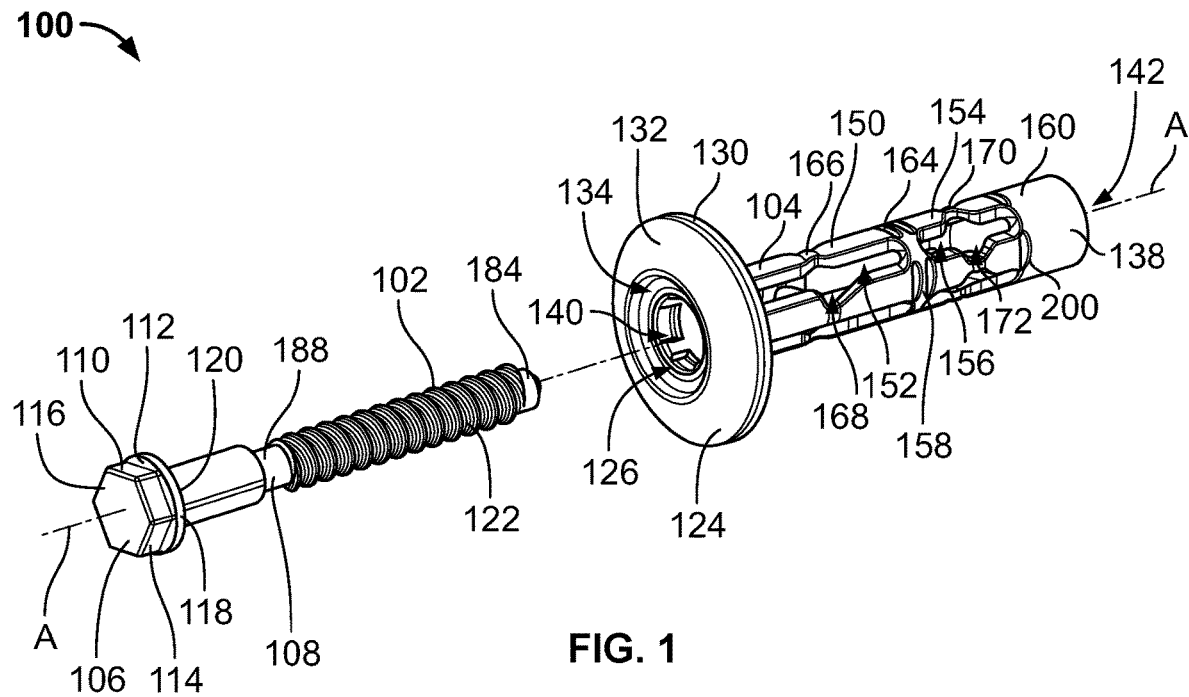
FIG. 1 is front, top, and right side isometric view of a fastener assembly that includes a pin and a rivet body, wherein the fastener assembly is shown in an unassembled configuration.
Figure 2:
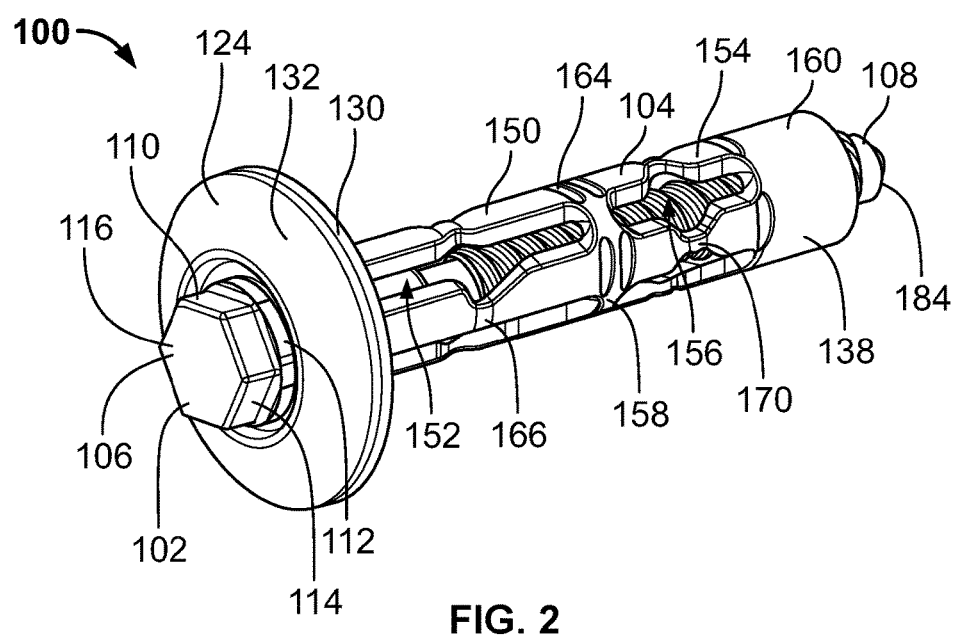
FIG. 2 is a front, top, and right side isometric view of the fastener assembly of FIG. 1 shown in a first, assembled configuration.
Figure 3:
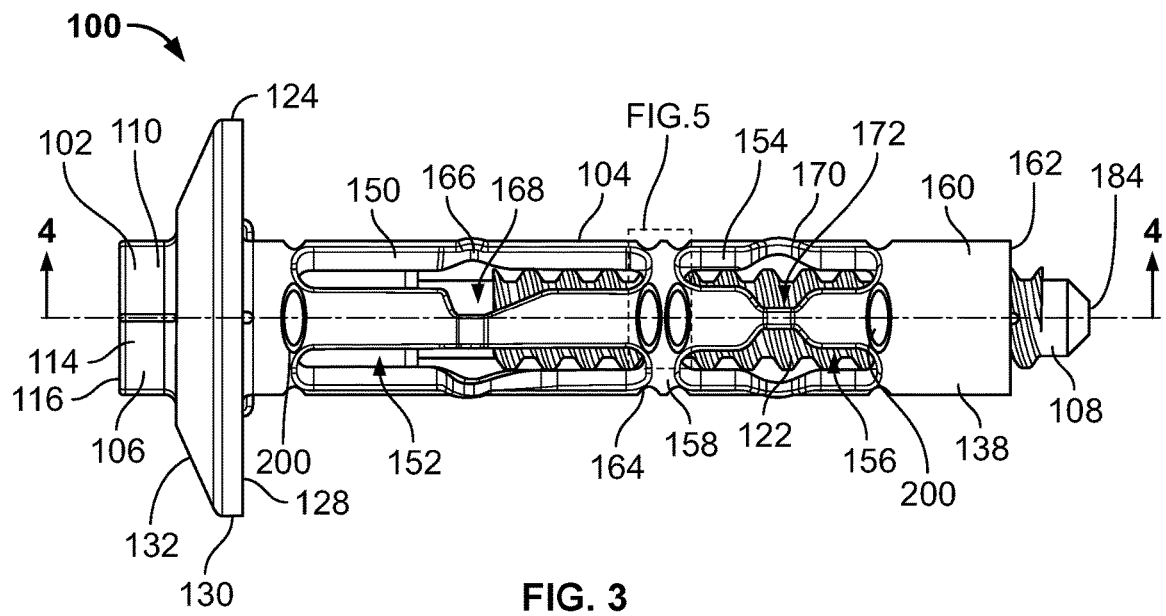
FIG. 3 is a right side elevational view of the fastener assembly of FIG. 2.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Certain embodiments of the present disclosure provide a fastener assembly configured to engage and secure a plurality of components together, e.g., a first component and a second component. Further embodiments provide a fastener assembly configured to transition between operational states by axial rotation and, more particularly, axial rotation of a component of the fastener assembly. Various embodiments also provide a fastener assembly configured to engage and secure components having varying thicknesses, as well as a fastener assembly configured to have a plurality of operational or fastening states.

Figure 11:
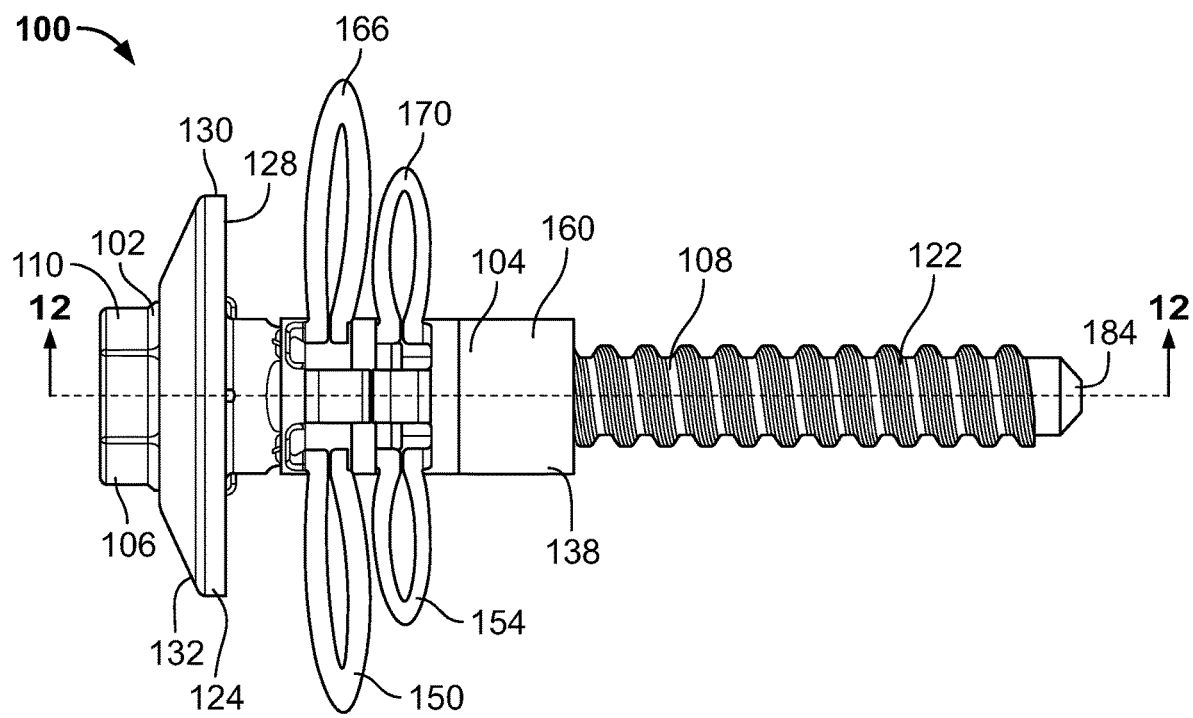
FIG. 11 depicts the fastener assembly of FIG. 3 in a second, assembled configuration.
Figure 12:
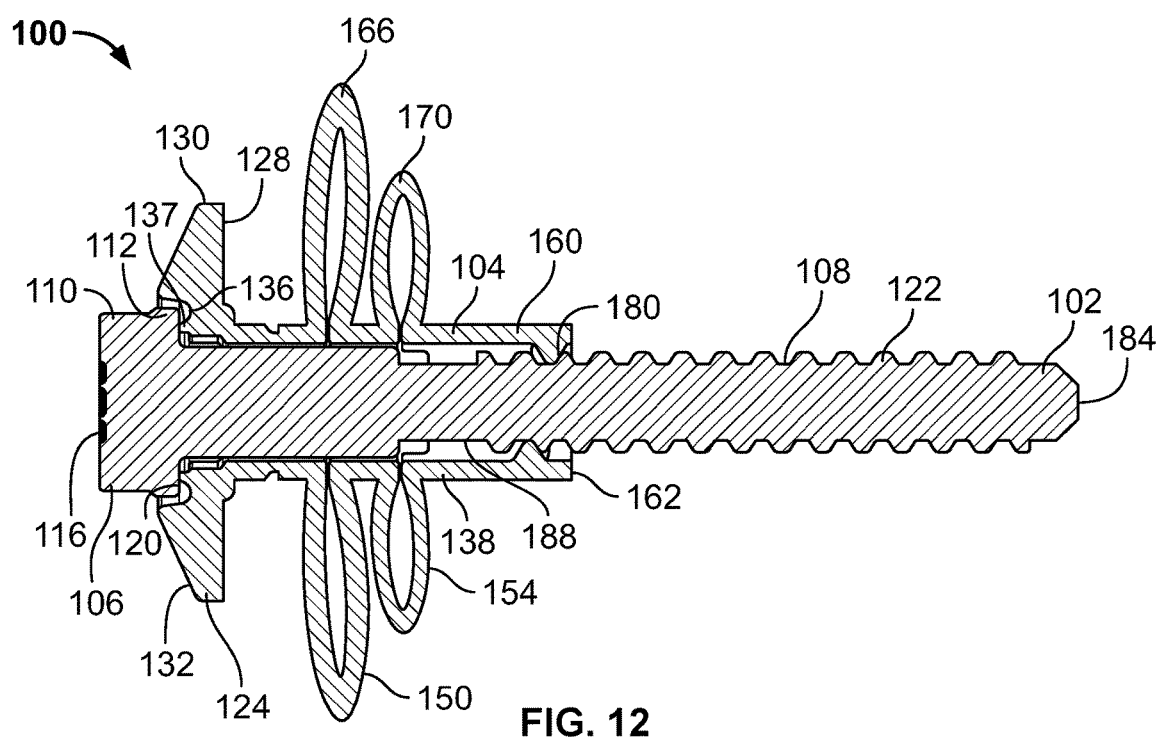
FIG. 12 is a cross-sectional view taken along lines 12-12 of FIG. 11.
Figure 13:
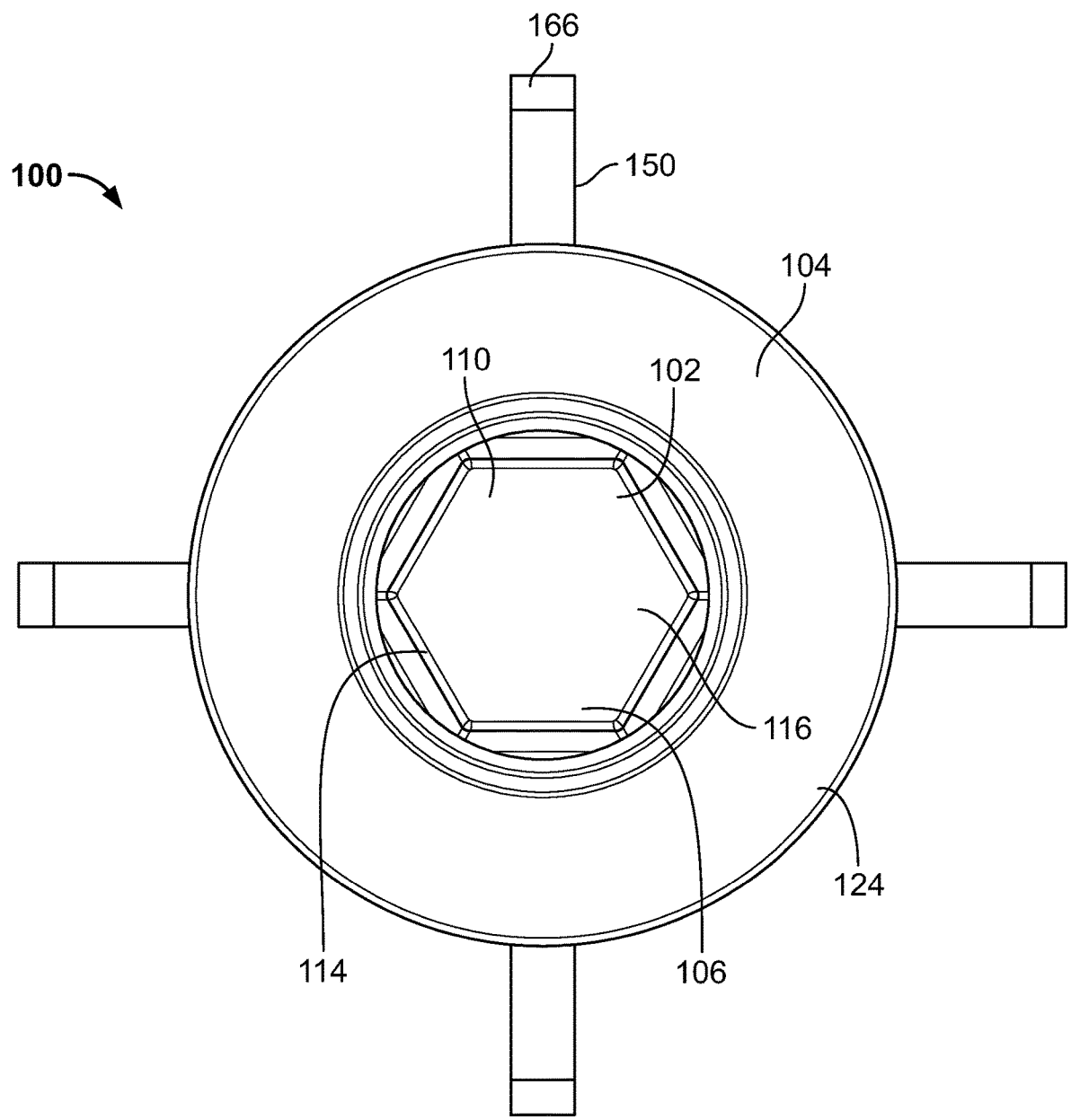
FIG. 13 is a front elevational view of the fastener assembly of FIG. 11.
Figure 14:
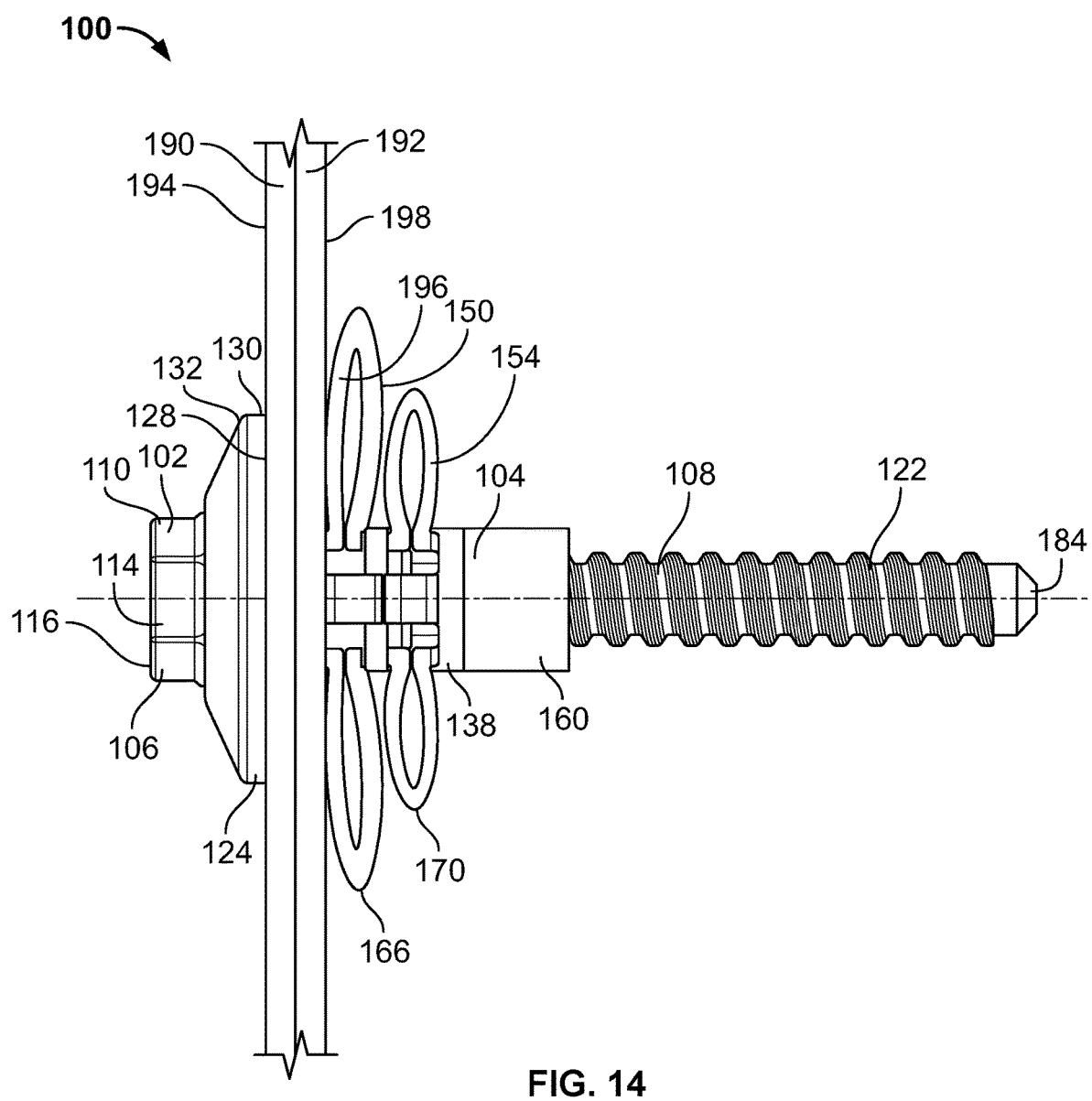
FIG. 14 illustrates the fastener assembly of FIG. 11 mated with first and second components.

FIGS. 1-14 depict a fastener assembly 100, according to an aspect of the present disclosure, having a pin 102 and a rivet body 104. More particularly, FIG. 1 depicts the fastener assembly 100 in an unassembled or non-operational configuration, FIGS. 2-7 depict the fastener assembly 100 in a first assembled or operational configuration, and FIGS. 11-13 depict the fastener assembly 100 in a second assembled or operational configuration. With reference to FIG. 14, the fastener assembly 100 is shown engaged and secured to a first component and a second component, as will be further discussed herein. As will also be further discussed herein, although the fastener assembly 100 is shown in only two assembled or operational states, the fastener assembly 100 may have a plurality of other operational states.

Turning to FIG. 1, the pin 102 includes a head 106 and a shaft 108 extending longitudinally therefrom. The head 106 includes an upper portion 110 and a lower portion 112, and in the present embodiment, the upper portion 110 is at least partially defined by a plurality of flat walls 114 and a top surface 116. The lower portion 112 includes a rim 118 located at a bottom surface 120 of the head 106. In this particular configuration, the upper portion 110 includes six walls 114, which may be generally characterized as a hex screw drive. As such, a user may rotate the head 106 of the pin 102 and, by extension, the shaft 108 of the pin 102 during use. For example, for the embodiment depicted in FIGS. 1-14, a user may rotate the head 106 of the pin 102 using a wrench.

It is also contemplated that the head 106 may utilize other configurations. For example, it is contemplated that a greater or fewer number of walls 114 may be provided. Indeed, the upper portion 110 may comprise three walls, or four walls, or five walls, or eight walls, or ten walls. In fact, any number of equidistantly spaced walls may be provided that allow for the rotation of the upper portion 110 by an applied torque. In yet other embodiments, the upper portion 110 may comprise other screw drives known in the art, such as a slotted drive (e.g., a slot or cross drive), a cruciform drive (e.g., a phillips or frearson drive), an internal drive (e.g., a square or hex drive), a hexalobular drive (e.g., a torx or polydrive), a three-pointed drive, or a special drive. In other words, according to embodiments discussed herein, the head 106 of the pin 102 is configured such that a user may apply a rotational force to the pin 102 to axially rotate the pin 102.

Regardless of the particular configuration of the upper portion 110 employed, the desired structure will allow for rotation of the head 106 and the accompanying shaft 108. Such rotation allows for one or more engagement features 122, e.g., threading in the present embodiment, to engage portions of the rivet body 104, as will be described in greater detail below.

With reference to FIGS. 1-4, the rivet body 104 includes a collar 124. The collar 124 of the present embodiment includes a generally annular configuration, i.e., a circular outer geometry with an opening 126 therethrough. However, other outer geometries are contemplated, e.g., a square, rectangle, oval, or any other shape. The collar 124 includes a bottom surface 128, which may be generally flat and perpendicular to the axis 4-4 (see FIG. 3). A sidewall 130 also extends between the bottom surface 128 and a beveled surface 132. In other embodiments, the surface 132 may take other linear forms, may be curvilinear, or may be a combination of both.

Figure 6:
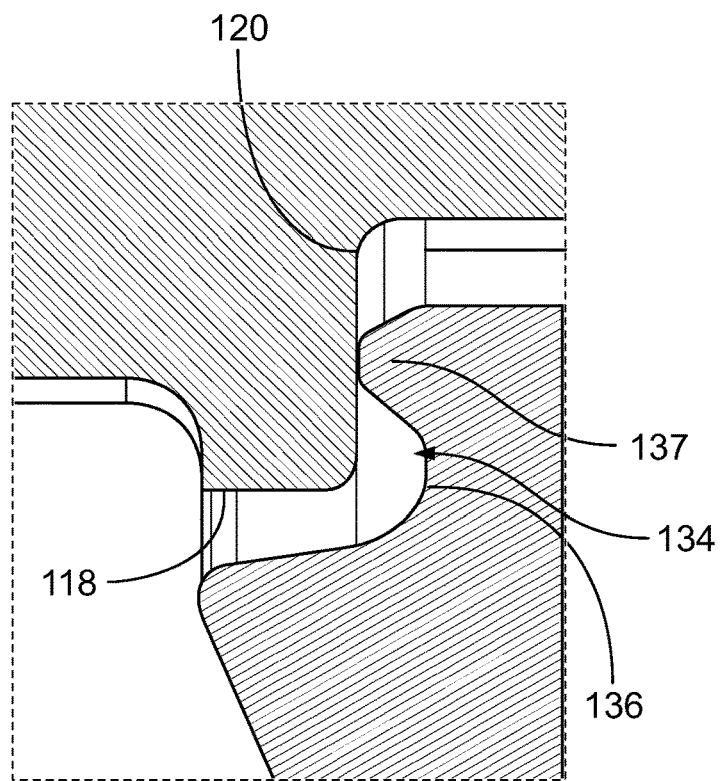
FIG. 6 is an enlarged view of a section of FIG. 4.
Figure 7:
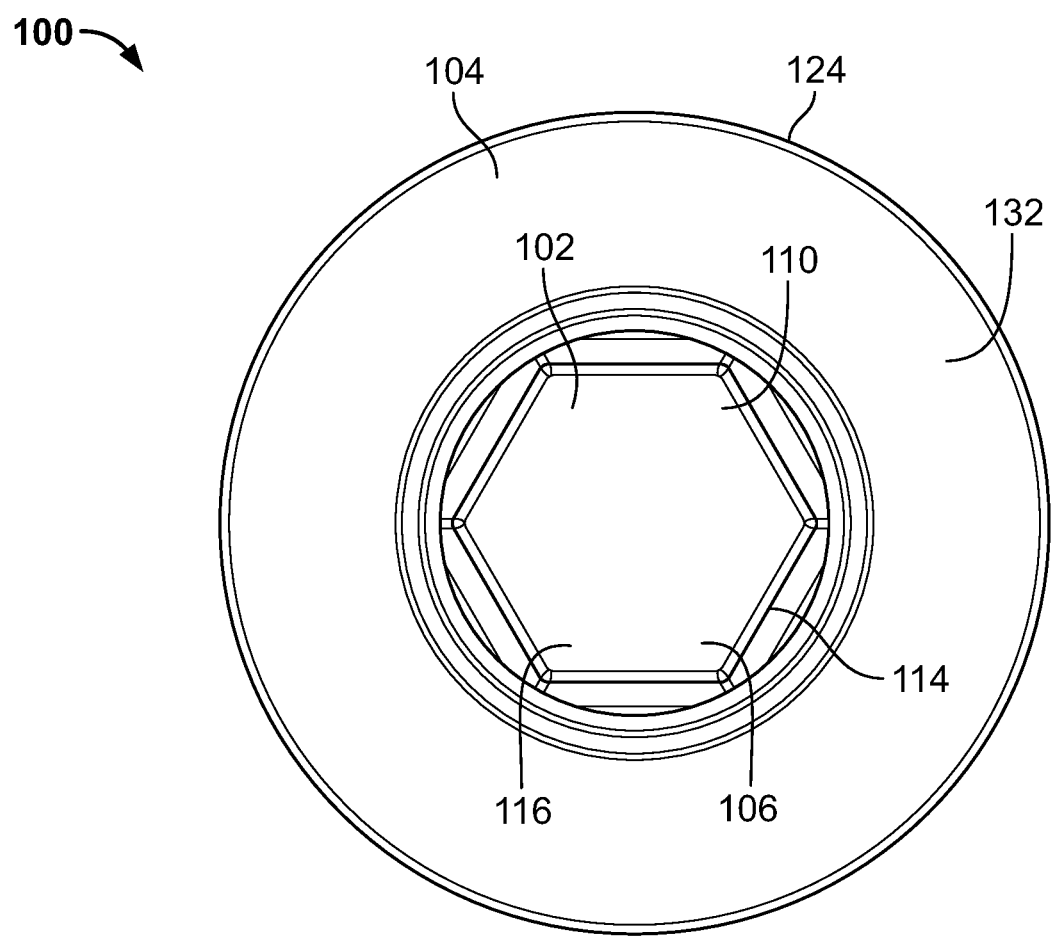
FIG. 7 is a front elevational view of the fastener assembly of FIG. 2.

Turning to FIGS. 1 and 6, a groove 134 is provided within the collar 124 and is defined by one or more walls. In the present embodiment, the groove 134 is defined by a wall 136, which is generally concave, and includes a projection 137 extending therefrom (see FIGS. 4 and 6). However, the wall 136 (or walls) may take other forms as may be contemplated by those of skill in the art. For example, the wall 136 may have a planar or V-shaped profile.

The opening 126 may be centered within the wall 136 and may be concentric with the axis A-A (see FIG. 1). A receiving column 138 extends below the bottom surface 128 of the rivet body 104 and includes an interior channel 140, which is in communication with the opening 126 (see FIGS. 1, 4, and 9). The interior channel 140 further extends to a second opening 142 on a side of the rivet body 104 that is opposite the opening 126. In a preferred embodiment, the opening 126, the interior channel 140, and the second opening 142 are concentrically arranged or aligned. For instance, as shown in FIG. 1, the opening 126, the interior channel 140, and the second opening all extend about the axis A-A.

With particular reference to FIGS. 1 and 8-10, the receiving column 138 may include a first set of legs 150 with radial gaps 152 therebetween, and a second set of legs 154 with radial gaps 156 therebetween. In this particular embodiment, the first set of legs 150 are longer than the second set of legs 154. In a preferred embodiment, the first set of legs 150 are at least 1.25 times longer than the second set of legs 154, or at least 1.5 times longer than the second set of legs 154, or at least 2 times longer than the second set of legs 154. Further, positioned between the first set of legs 150 and the second set of legs 154 is an intermediate annular rim 158, and below the second set of legs 154 is a lower annular rim 160 proximate a lower exterior edge 162, which defines the second opening 142 (see FIG. 9). The intermediate annular rim 158 may include one or more recessed surfaces 164 (see FIG. 5) positioned between the first set of legs 150 and the second set of legs 154.

Still referencing FIGS. 1 and 8-10, the first set of legs 150 may each, individually, include a flexible bridge or intermediate section 166 having a cut-out section or notch 168 that is coextensive with the radial gaps 152. The second set of legs 154 may also include a flexible bridge or intermediate section 170 with one or more notches 172 that are coextensive with the radial gaps 156. The flexible intermediate sections 166, 170 of the first set of legs 150 and the second set of legs 154 allow the legs 150, 154 to flex outwardly during operational use, as will be further discussed herein.

Figure 9:
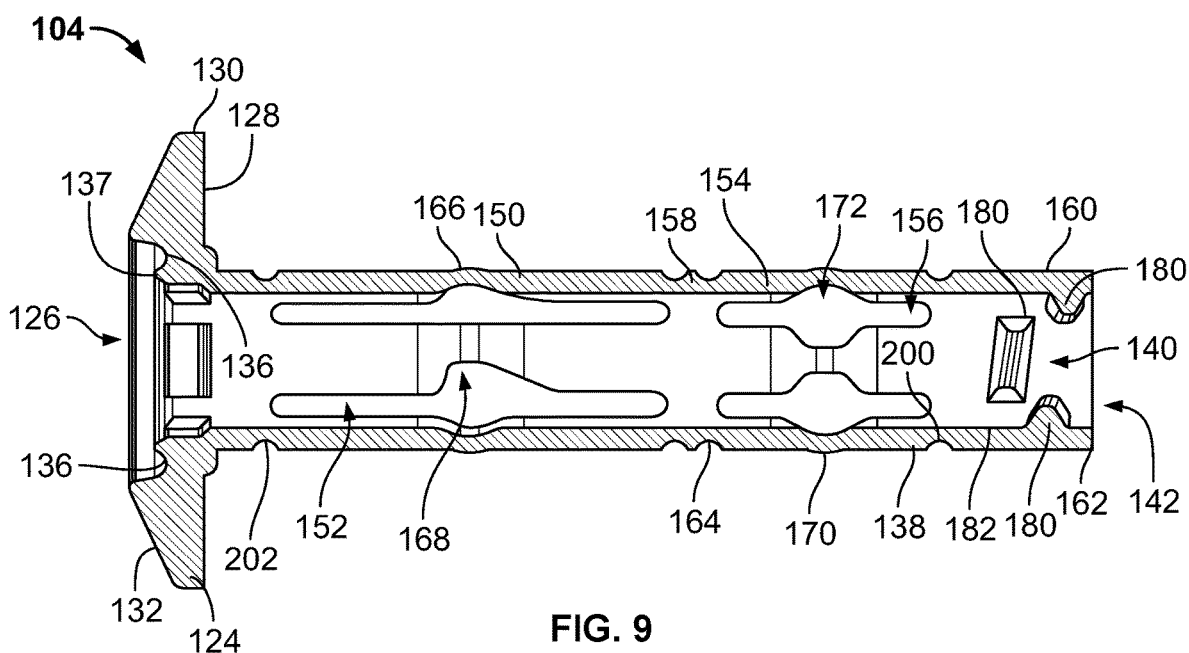
FIG. 9 is a cross-sectional view taken along lines 9-9 of FIG. 8.
Figure 10:
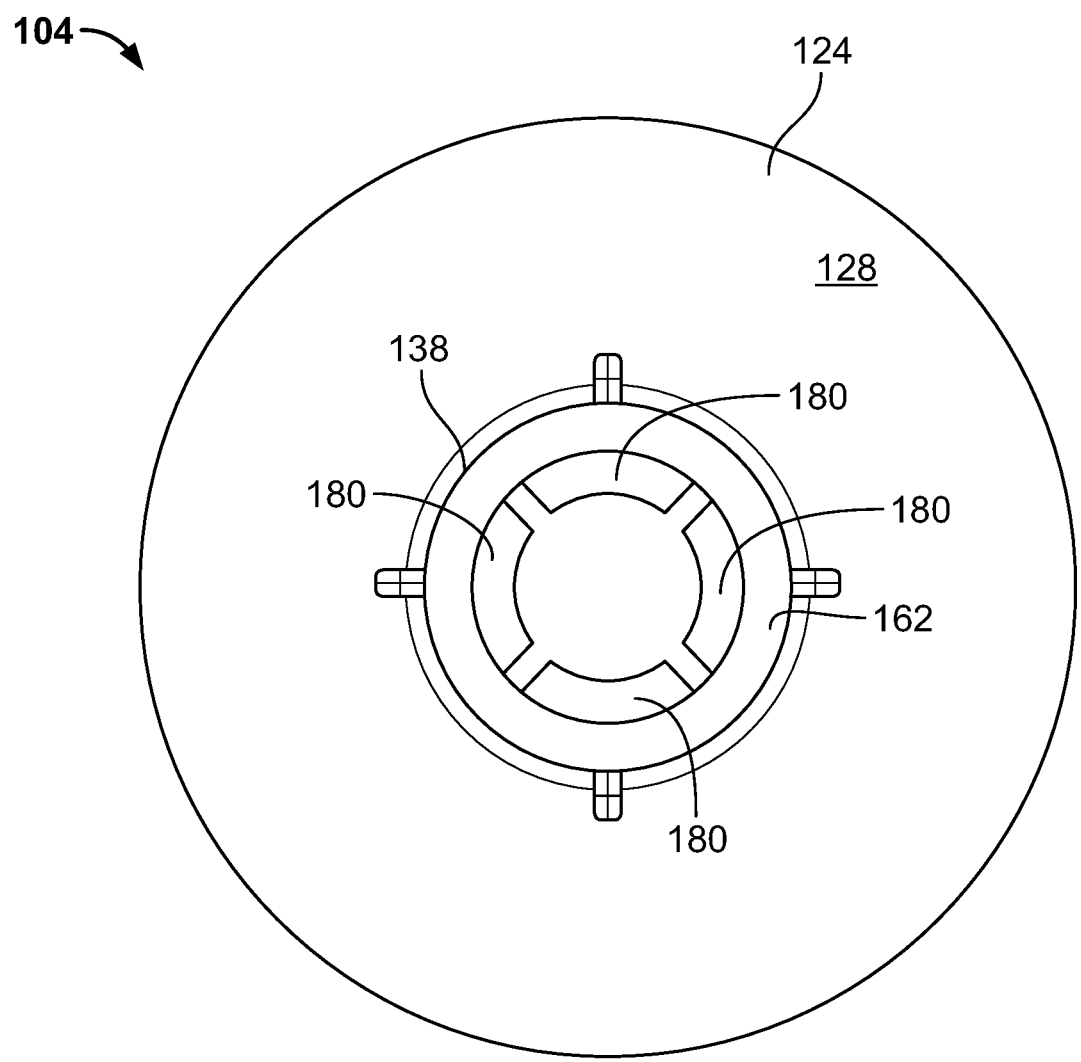
FIG. 10 is a rear elevational view of the rivet body of FIG. 8.

As shown in FIG. 9, the receiving column 138 also includes one or more radial protrusions 180 on an interior surface 182 of the receiving column 138. In this particular embodiment, the rivet body 104, and the receiving column 138 thereof, includes four radial protrusions 180 evenly spaced around a circumference of the interior surface 182 of the rivet body 104 (see FIGS. 9 and 10). Further, in this particular embodiment, the radial protrusions 180 are adjacent the lower exterior edge 162 and offset relative to one another, such that some radial protrusions 180 are closer to the lower exterior edge 162 compared to the other radial protrusions 180.

With particular reference to FIG. 1, the pin 102 may be positioned within the rivet body 104 by inserting a tip 184 of the pin 102 into the opening 126 of the collar 124. Further, surfaces defining the groove 134, such as the wall 136, may provide a guiding function to align the tip 184 within the opening 126 so that it may be inserted into the interior channel 140 of the receiving column 138. More particularly, the pin 102 may be inserted into the rivet body 104 until the rim 118 of the head 106 (or otherwise the bottom surface 120) is disposed adjacent the projection 137 of the wall 136. In a preferred embodiment, the rim 118 of the head 106 (or otherwise the bottom surface 120) is juxtaposed with the projection 137 (see FIG. 6).

As noted above, the upper portion 110 of the pin 102 includes a screw drive, which is depicted as a hex screw drive in the present embodiment. As such, a tool (not shown) may cooperate with the upper portion 110 to rotate the pin 102 during use. Further, once the rim 118 or the bottom surface 120 of the head 106 is proximate or in contact with the projection 137, the projection 137 may function as a washer feature. Still further, rotation of the pin 102 is effected by the radial protrusions 180 rotationally engaging with the engagement features 122, which are shown as threads in the present embodiment.

More particularly, rotation of the upper portion 110 of the pin 102 causes the radial protrusions 180 to travel along the engagement features 122, to allow for the longitudinal translation of the lower annular rim 160 toward the head 106. Such movement also allows for the flexible intermediate section 166 and the flexible intermediate section 170 to flex outwardly, as shown in FIGS. 11-13. In the present embodiment, the notches 168 and the notches 172 also function to control rotation or prevent rotation of the rivet body 104. For example, the notch 168 may redirect a force applied to the intermediate section 166 toward a rigid portion of the first set of legs 150, e.g., a portion of the first set of legs 150 that is not flexible. The pin 102 also includes a relief portion 188, e.g., a portion without engagement features 122 or threading, which prevents over rotation of the rivet body 104. More particularly, once the radial protrusions 180 of the rivet body 104 align with the relief portion 188, rotation of the rivet body 104 ceases.

The cooperation between the radial protrusions 180 of the rivet body 104 and the engagement features 122 of the pin 102 also improves the retention strength of the fastener assembly 100. More particularly, whether the fastener assembly 100 is in a first assembled state (such as that shown in FIGS. 3 and 4) or a second assembled state (such as that shown in FIGS. 11 and 12), one or more of the radial protrusions 180 are seated on or engaged with the engagement features 122. As such, the radial protrusions 180 and the engagement features 122 prevent axial or longitudinal movement of the lower annular rim 160 toward the tip 184 of the pin 102 when a large load is applied to the first set of legs 150 and/or the second set of legs 154.

During use, a user may first insert the pin 102 into the rivet body 104 as previously noted above. The pin 102 and the rivet body 104 are then rotationally engaged by causing the radial protrusions 180 and the engagement features 122 to mate with one another, thus providing the fastener assembly 100 in a first, assembled state as depicted in FIGS. 2-7. Next, a user may insert the assembled faster assembly 100 through one or more panels. For example, as shown in FIG. 14, the fastener assembly 100 may be inserted into a first and second hole (not shown) of a first panel 190 and a second panel 192, respectively. More particularly, the fastener assembly 100 may be positioned through the holes of the first and second panels 190, 192 so that the rim 118 or bottom surface 128 is proximate and in contact or engaged with an outside surface 194 of the first panel 190.

After insertion of the fastener assembly 100 through the first and second holes of the first and second panels 190, 192, a user rotates the upper portion 110 of the pin 102. Upon rotation of the upper portion 110 of the pin 102, the lower annular rim 160 rides longitudinally along the engagement features 122. Continued movement of the lower annular rim 160 causes the flexible intermediate section 166 and the flexible intermediate section 170 to flex outwardly. In particular, a user may rotate the upper portion 110 until a first side 196 of the first set of legs 150 contacts a rear side 198 of the second panel 192. In addition, the second set of legs 154 may flex outwardly so that they are proximate the first set of legs 150 and provide support therefor. As such, the second set of legs 154 may be composed of a stiffer or more robust material than the first set of legs 150.

Figure 4:
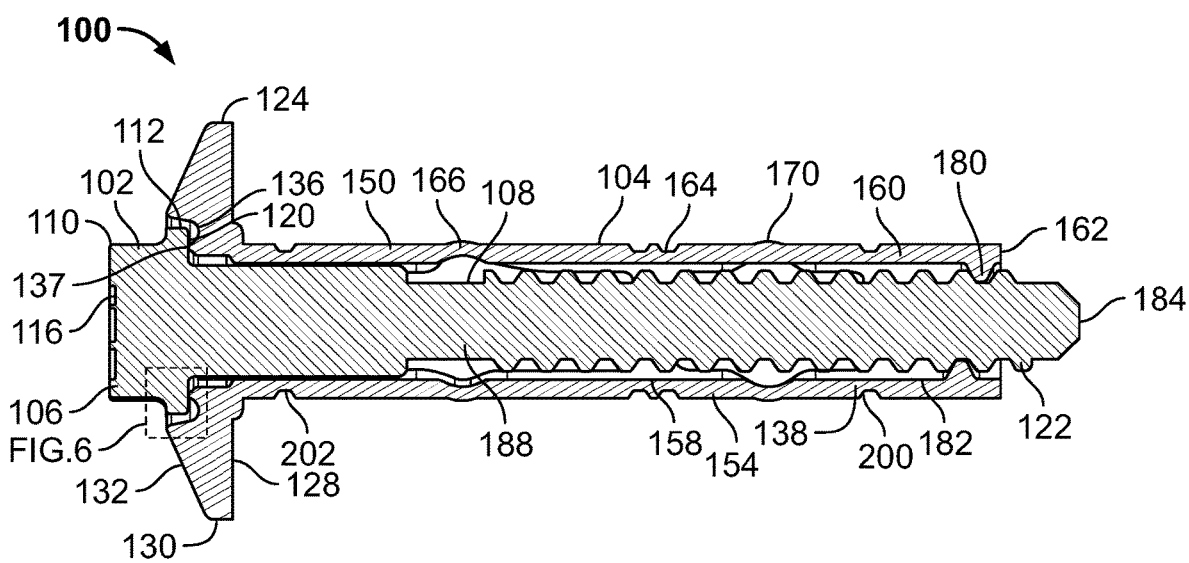
FIG. 4 is a cross-sectional view taken along lines 4-4 of FIG. 3.

As discussed above, the lower annular rim 160 rides longitudinally along the engagement features 122 upon rotation of the lower portion 112 of the pin 102. During this axial rotation, a distance between the bottom surface 120 of the lower portion 112 of the pin 102 and the bottom surface 128 of the collar 124 of the rivet body 104 remains constant. For example, as shown in FIGS. 4 and 12, the distance between the bottom surface 120 of the lower portion 112 of the pin 102 and the bottom surface 128 of the collar 124 of the rivet body 104 is the same. Further, in this particular embodiment, the bottom surface 120 of the lower portion 112 of the pin 102 is in contact with the projection 137 of the rivet body 104 throughout axial rotation of the pin 102 relative to the rivet body 104.

Conversely, a distance between the bottom surface 120 of the lower portion 112 of the pin 102 and the lower exterior edge 162 of the rivet body 104 decreases upon rotation of the pin 102 relative to the rivet body 104. Further, a distance between the tip 184 of the pin 102 and the lower exterior edge 162 of the rivet body 104 increases upon rotation of the pin 102, and a distance between the tip 184 of the pin 102 and the bottom surface 128 of the collar 124 of the rivet body 104 remains constant upon rotation of the pin 102.

Although the fastener assembly 100 is only shown in a first assembled state (e.g., see FIG. 3) and a second assembled state (e.g., see FIG. 11), it is contemplated that axial rotation of the pin 102 relative to the rivet body 104 may cease at any time while the fastener assembly 100 is transitioning between the first assembled state and the second assembled state. For example, axial rotation of the pin 102 relative to the rivet body 104 may cease halfway through the transition between the first assembled state shown in FIG. 3 and the second assembled state shown in FIG. 11. In this particular embodiment, the first set of legs 150 and the second set of legs 154 would only partially collapse. As such, the fastener assembly 100 may have a plurality of assembled states, which provides variability during use of the fastener assembly 100. In particular, this variability allows the fastener assembly 100 to secure components having variable width. For example, if the fastener assembly 100 is used to secure components together having a combined width that is small, the pin 102 may be axially rotated such that the first set of legs 150 and the second set of legs 154 fully collapse. On the other hand, if the fastener assembly 100 is used to secure components together having a combined width that is large, the pin 102 may be axially rotated to a lesser degree such that the first set of legs and/or the second set of legs 154 only partially collapse.

The pin 102 of the fastener assembly 100 may also be rotated in an opposite direction. Rotation of the pin 102 in an opposite direction may cause the lower annular rim 160, and the lower exterior edge 162 thereof, to move toward the tip 184 of the pin 102 and away from the bottom surface 128 of the rivet body 104. In effect, rotation of the pin 102 in an opposite direction allows the fastener assembly 100 to transition back to the first assembled state (see FIG. 3) from the second assembled state (see FIG. 11). During use, the pin 102 of the fastener assembly 100 may be rotated in an opposite direction when a user desires to remove the fastener assembly 100 from components (e.g., first component 190 and second component 192), for example.

Figure 5:
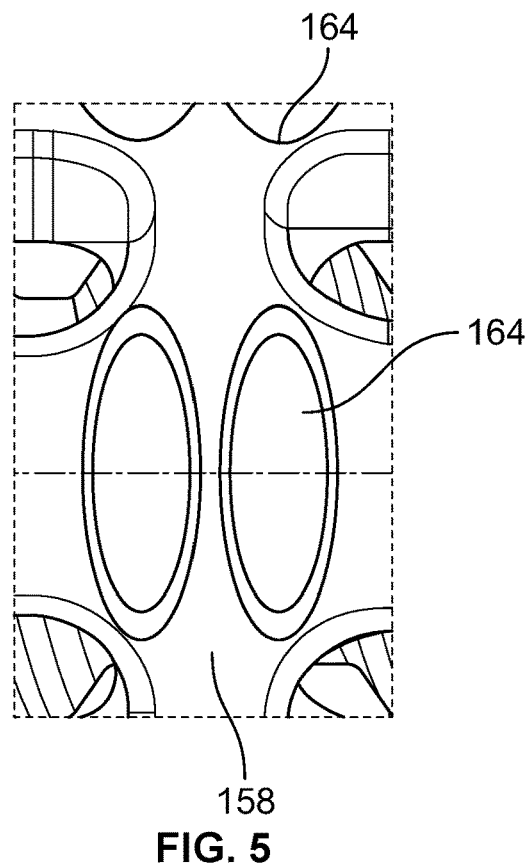
FIG. 5 is an enlarged view of a section of FIG. 3.
Figure 8:
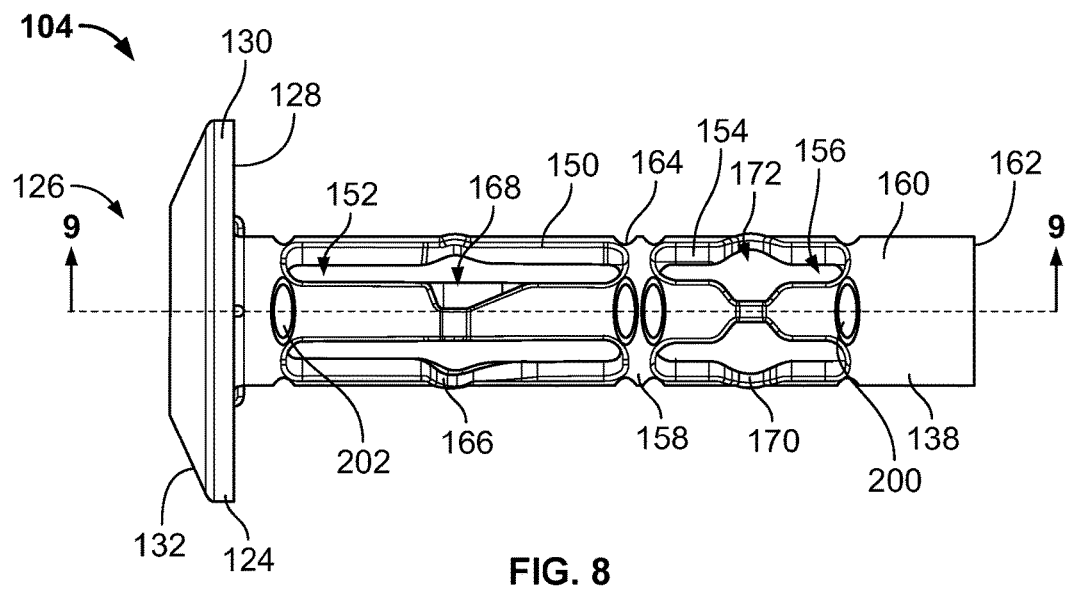
FIG. 8 is a right side elevational view of the rivet body of FIG. 1.

Referencing FIG. 5, the intermediate annular rim 158 includes the recessed surfaces 164, which may also provide energy support for the fastener assembly 100. More particularly, once the fastener assembly 100 is in the second, assembled state (as shown in FIG. 14), the recessed surfaces 164 may provide a flexibility to the fastener assembly 100 once a force is exerted onto the fastener assembly 100, the first panel 190, and/or the second panel 192. As best shown in FIG. 8, the lower annular rim 160 may also include one or more recessed surfaces 200 and an upper portion of the receiving column 138 may also include one or more recessed surfaces 202. In particular embodiments, the recessed surfaces may be positioned around an outer circumference of the receiving column 138, proximate the first set of legs 150, and/or proximate the second set of legs 154.

In addition, the interaction between the radial protrusions 180 and the engagement features 122 may provide added support or stability to the fastener assembly 100. For example, in the present embodiment, once the fastener assembly 100 is in the second, assembled state, the pin 102 and the rivet body 104 may be positionally locked relative to one another and movement of the pin 102 through the receiving column 138 is only possible upon rotation of the upper portion 110 of the pin 102.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The term "about," as used herein, refers to variation in the numerical quantity that may occur, for example, through typical measuring and manufacturing procedures for embodiments of the disclosure herein. Throughout the disclosure, the terms "about" refer to a range of values±5% of the numeric value that the term precedes.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

I claim:

1. A fastener assembly, comprising:
a fastener body including a collar and a receiving column having a protrusion on an inner surface thereof, the fastener body defining a longitudinal axis; and
a pin including a threaded section,
wherein the protrusion is configured to engage and cooperate with the threaded section,
wherein a projection extends from an inner annular wall of the collar, away from the receiving column, parallel to the longitudinal axis, and into a void, such that a longitudinal gap is formed laterally between the projection and the inner annular wall, and
wherein the receiving column further includes a first set of legs that are configured to fold above a second set of legs with respect to the longitudinal axis.

2. The fastener assembly of claim 1, wherein the pin is configured to be positioned within the receiving column.

3. The fastener assembly of claim 1, wherein the first and second sets of legs are configured to fold upon rotation of the pin.

4. The fastener assembly of claim 3, wherein the receiving column includes a lower distal end, and wherein the protrusion cooperates with the threaded section to move the lower distal end relative to the pin upon rotation of the pin.

5. The fastener assembly of claim 4, wherein the first and second sets of legs are configured to collapse upon rotation of the pin.

6. The fastener assembly of claim 1, wherein the pin remains engaged with the projection throughout rotation thereof.

7. The fastener assembly of claim 6, wherein the receiving column includes four protrusions equally spaced around a circumference of the inner surface of the receiving column.

8. The fastener assembly of claim 1, wherein an annular rim extends between the first set of legs and the second set of legs, and wherein the annular rim includes a plurality of recessed surfaces.

9. A fastener assembly, comprising:
a fastener body including a collar and a receiving column, the fastener body defining a longitudinal axis; and
a pin,
wherein the receiving column is configured to collapse upon rotation of the pin,
wherein a projection extends from an inner annular wall of the collar and into a void,
wherein the receiving column further includes a first set of reinforcing legs that are configured to fold above a second set of reinforcing legs with respect to the longitudinal axis, and
wherein an annular rim extends between the first set of reinforcing legs and the second set of reinforcing legs.

10. The fastener assembly of claim 9, wherein the receiving column includes a distal end wall and the collar includes a bottom surface, and wherein the receiving column extends between the bottom surface and the distal end wall.

11. The fastener assembly of claim 10, wherein the pin includes a head.

12. The fastener assembly of claim 11, wherein a distance between the head of the pin and the distal end wall of the receiving column in the collapsed state is smaller than a distance between the head of the pin and the distal end wall of the receiving column in an initial state.

13. The fastener assembly of claim 12, wherein a distance between the head of the pin and the bottom surface of the collar in the collapsed state is equal to a distance between the head of the pin and the bottom surface of the collar in an initial state.

14. The fastener assembly of claim 13, wherein the first and second reinforcing legs are configured to fold upon rotation of the pin.

15. The fastener assembly of claim 14, wherein a lower annular rim extends between the second set of reinforcing legs and the distal end wall.

16. The fastener assembly of claim 15, wherein the annular rim comprises a recessed surface.

17. A fastener assembly, comprising:
a fastener body including a collar and a receiving column; and
a pin including a head,
wherein the receiving column is configured to collapse upon rotation of the pin,
wherein a distance between the head of the pin and a bottom surface of the collar in the collapsed state is equal to a distance between the head of the pin and the bottom surface of the collar in an initial state, and
wherein a projection extends from an inner annular wall of the collar and into a void, a bottom surface of the head extending radially outward of a top surface of the projection and radially inward of the inner annular wall.

* * * * *